(12) United States Patent
Toupin

(10) Patent No.: US 8,595,291 B2
(45) Date of Patent: Nov. 26, 2013

(54) SERVER HIERARCHICAL STRUCTURE ON USER-AGENTS

(75) Inventor: Tory Toupin, Thornton, CO (US)

(73) Assignee: Motivity Solutions, Inc., Greenwood Village, CO (US)

(*) Notice: Subject to any disclaimer, the term of this patent is extended or adjusted under 35 U.S.C. 154(b) by 64 days.

(21) Appl. No.: 13/198,623

(22) Filed: Aug. 4, 2011

(65) Prior Publication Data

US 2013/0036157 A1 Feb. 7, 2013

(51) Int. Cl.
*G06F 15/16* (2006.01)

(52) U.S. Cl.
USPC .......................................................... 709/203

(58) Field of Classification Search
USPC .............................. 709/229, 231, 203; 714/45
See application file for complete search history.

(56) References Cited

U.S. PATENT DOCUMENTS

| | | | | |
|---|---|---|---|---|
| 6,115,741 | A * | 9/2000 | Domenikos et al. | 709/217 |
| 7,451,286 | B2 * | 11/2008 | Nadathur et al. | 711/162 |
| 7,500,223 | B2 | 3/2009 | DeSantis | |
| 2001/0032106 | A1 * | 10/2001 | Smith et al. | 705/7 |
| 2002/0087630 | A1 * | 7/2002 | Wu | 709/203 |
| 2004/0199577 | A1 * | 10/2004 | Burd et al. | 709/203 |
| 2004/0230894 | A1 * | 11/2004 | Elza et al. | 715/511 |
| 2006/0020578 | A1 * | 1/2006 | Hood | 707/3 |
| 2006/0020883 | A1 * | 1/2006 | Kothari et al. | 715/513 |
| 2006/0050973 | A1 * | 3/2006 | Ishikawa | 382/232 |
| 2006/0248350 | A1 * | 11/2006 | Stanev | 713/189 |
| 2007/0220081 | A1 * | 9/2007 | Hyman | 709/203 |
| 2008/0147716 | A1 * | 6/2008 | Omoigui | 707/102 |
| 2009/0262741 | A1 * | 10/2009 | Jungck et al. | 370/392 |
| 2011/0173184 | A1 * | 7/2011 | Kelshikar et al. | 707/722 |

* cited by examiner

*Primary Examiner* — Asad Nawaz
*Assistant Examiner* — Syed S Ali
(74) *Attorney, Agent, or Firm* — Merchant & Gould PC

(57) ABSTRACT

Disclosed herein are computer systems and computer implemented methods for mirroring server-side data hierarchy on a client. The methods involve sending or receiving a request for a instructions to be executed on the client; determining that the webpage requires a mirrored structure to be created on the client side; and receiving or delivering computer instructions, wherein the computer instructions comprise information that, when executed, create a client-side data hierarchy on the client, the client-side data hierarchy mirroring the server-side data hierarchy. The server-side data hierarchy may be a tree data structure and further comprises: a plurality of server-side nodes, each node comprising substantially independent functionality. The client-side data hierarchy mirroring the server-side data hierarchy comprises a plurality of client-side nodes, wherein each client-side nodes corresponds with one of the plurality of server-side nodes.

10 Claims, 8 Drawing Sheets

SERVER HIERARCHICAL STRUCTURE ON USER-AGENTS

BACKGROUND

Some user-agents, e.g., browsers such as Firefox, Internet Explorer, Google Chrome, etc., receive dynamic instructions from servers via a network of computers. Management of the instructions that servers deliver to user-agents has traditionally been done in an ad hoc manner. Often, these instructions are delivered to the user-agent without any consideration as to an organizational structure for these instructions. Common code libraries often store these computer instructions. These libraries deliver computer instructions as a "chunk" of code to the user-agent. There is often no logical relationship or hierarchical structure among the processes that the code is meant to perform.

This current practice creates certain problems. As an example, the lack of hierarchical structure creates inherent problems because of naming conflicts. Often, code libraries aggregate many programmers' computer instructions. These programmers may use identical names for functions within the computer instructions. Occasionally, multiple functions are delivered to the browser that may have the same name. When the browser, or user-agent tries to execute the function, the naming conflict causes an error or unexpected behavior.

Further, when a web developer attempts to fix any problems associated with a webpage, it is often challenging to read and decipher the code that has been delivered to the user-agent, i.e., the "client-delivered code." Because the first step in fixing any errors with computer instructions is to understand the instructions, the inability of web developers to quickly understand the instructions lengthens debug time.

A current work-around to the ad hoc, non-hierarchical, client-delivered code is to simply have the server perform the function. However, this creates inefficiencies. For example, having the server perform the function requires communication between the user-agent and the server. This adds to the time it takes for the user to receive results. This time is compounded if the function requires input from the user. Each time the server requires user input, information must travel from the client, e.g., the user-agent, to the server and then back to the client.

In addition to timing inefficiencies, having the server perform the function(s) also prevents the computer processor load from being appropriately distributed between the server and the client. Because many clients might make a request for the server to perform a function, a server might lack the processing power to quickly serve all the requests from multiple clients.

The result of this ad hoc management of instructions renders creation and support of webpages inefficient, lengthens the time for user interaction, increases network footprints, and prevents optimization of computer processing power. It is with respect to this general environment that embodiments of the present disclosure have been contemplated. Although specific problems have been addressed in this Background, this disclosure is not intended in any way to be limited to solving those specific problems.

SUMMARY

Embodiments are disclosed for mirroring the server-side hierarchical structure on user-agents. Structures capable of decreasing webpage development and maintainability time and cost, efficiently communicating between user-agents and servers, increasing visual performance of the user-agent, and dynamically creating instructions from the user-agent are disclosed.

Traditionally, webpages might be conceptualized two ways. First, a webpage might be conceptualized as a server control hierarchy that results from the syntactic structure of the page. Second, the webpage might be conceptualized as Hyper Text Markup Language ("HTML") that corresponds to each server control in the hierarchy.

Both of the previous conceptions results in a practice where there is generally a single HTML root node corresponding to a server control.

Embodiments disclosed here in provide a third way of conceptualizing and designing a webpage, and it introduces the concept of a client peer control. In Embodiments, instead of their being an HTML root node corresponding to a server control, there is an HTML root node corresponding to the client peer control. This HTML root node provides a place where both the client and server controls can be mapped. In embodiments, the client peer control may not exist on the server. Instead, the client peer control provides an analogue to the server control.

Particular embodiments disclosed relate to computer systems and computer implemented methods for mirroring server-side data hierarchy on a client. The methods involve receiving a request for a instructions to be executed on the client; determining that the webpage requires a mirrored structure to be created on the client side; and delivering computer instructions, wherein the computer instructions comprise information that, when executed, create a client-side data hierarchy on the client, the client-side data hierarchy mirroring the server-side data hierarchy. In particular embodiments, the computer instructions comprise JavaScript or some other form. The server-side data hierarchy may be a tree data structure and further comprises: a plurality of server-side nodes, each node comprising substantially independent functionality. The client-side data hierarchy mirroring the server-side data hierarchy comprises a plurality of client-side nodes, wherein each client-side nodes corresponds with one of the plurality of server-side nodes.

In other particular embodiments, methods are disclosed for creating a client-side data hierarchy that mirrors a server-side data hierarchy. More specifically, these methods involve sending a request, by a client computer system, for predetermined functionality to a server computer system; receiving computer instructions from the sever computer system; executing the received computer instructions; upon executing the received computer instructions, building the client side data hierarchy to mirror the server-side data hierarchy; and using locally cached information to build the client-side data hierarchy. Additionally, the method may involve use information stored in a library independent from the server. In some embodiments, the method may include requests back to the server and/or independently creates nodes on the client that do not exist on the server.

Other specific embodiments relate to the use of a customized function that translates a request for a specific type of server control name into a script. The translation locates an object type based on a type name associated with the specific type; checks an assembly for an embedded resource file that corresponds to the server control name; and returns the contents of the embedded resource.

The result, in embodiments of the present invention, involves mirroring of the server hierarchical controls delivered to the user-agent, allowing for reduction in naming conflicts and debug time, and leveraging the advantages of object-oriented programming. Consequently, communication between the server and user-agent is optimized.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number may represent the same element or same type of element in all drawings.

DETAILED DESCRIPTION

Figure 1:
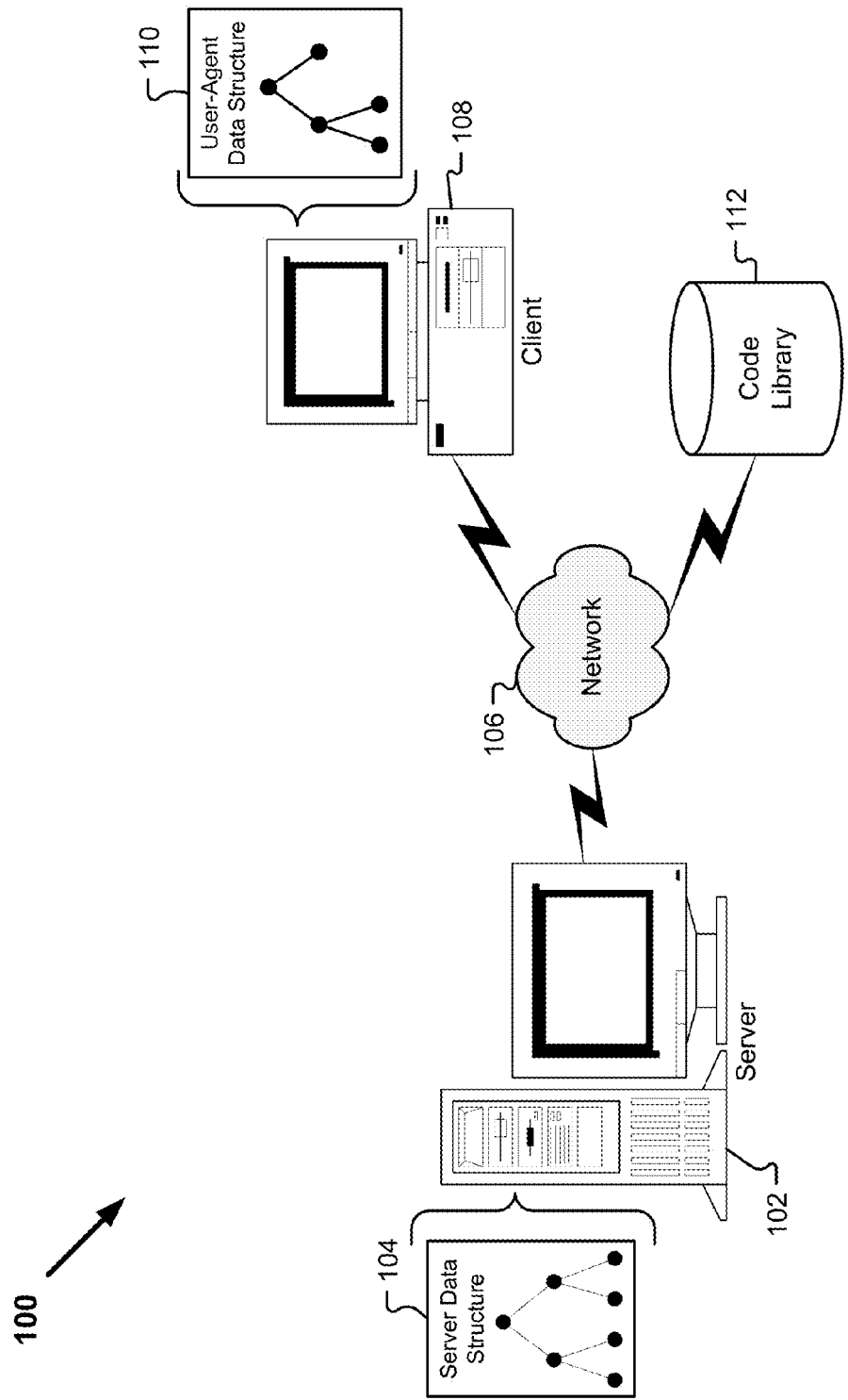
FIG. 1 represents a networked system for mirroring a server-side hierarchical structure on a user-agent in accordance with aspects of the present invention.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are sometimes indicated with like reference numerals.

Embodiments of a system are disclosed for generating server-side hierarchical structures on a user-agent. The user-agent may be a client-side application, such as a browser running on a client in a client-server environment. Information sent to the user-agent may contain computer instructions that create objects on the user-agent that represent the objects on a server. As will be better appreciated from the discussion below, the generation of the client-side hierarchical structure, provides many benefits, e.g., streamlining the development process and delivering more functionality to the client side, such that more can be done on the client instead of on the server.

Other embodiments of the present invention are disclosed that improve client side autonomy. In such embodiments, it will be appreciated that computer instructions, such as Java Script ("JS") are not simply extensions of the server. Instead, the client-side instructions form "client peer controls" wherein the each control relates to a server control in name and design, but is otherwise independent code. This allows the client control to be an "equal collaborator" with the server control. Consequently, communication between client and server generally only occurs during: (1) the initial delivery of a node from which the mirrored hierarchical client peer will be created, (2) callbacks issued from the client peer control to the server control, and (3) delivery of data, over and above data required for the markup, necessary so that the client peer control can perform a function properly.

An exemplary environment 100 implementing aspects of the present invention is shown in FIG. 1. In general, embodiments of the present invention involve a server 102 having server-side controls (or at least the code to create such controls). The controls stored on the server 102 are represented as data structure 104. The server 102 communicates with a client 108 through network 106. The client 108, according to aspects of the invention, requests and receives client-side controls in the form of a data struction 110.

In an embodiment, client 108 requests information, such as a webpage from the server 102 through the network 106. The server 102 returns a set of computer instructions, including instructions that when performed by client computer 108, creates a mirrored data structure 110 of the server data structure 104. This may be performed, for example, by the server 102 delivering JS code, or other code such as C++, C, Java, etc., to the client 108, that when run on the client 108, causes the creation of a user-agent data structure 110 that mirrors the server data structure 104.

The server 102 serves the requests of one or more clients. In an embodiment, the server 102 is a computer, or a series of computers, linked together that serves requests of other programs, such as computer programs of the client 108. The server 102 normally comprises a computer program running to serve the needs of the client 108, and physical hardware such as computer processor(s), memory, hard drive(s), communication connections, and input/output devices. As an example, the client 108 might request information to render a webpage which is fulfilled by the server 102 through the use of server controls. Server controls are tags that are understood by the server and/or the computer system rendering information. In an embodiment, server controls determine how a webpage or a region of a webpage will be rendered as Hypertext Markup Language ("HTML"). The controls render HTML to the client-side display when the page is executed thereon.

The server data structure 104 shown in FIG. 1 may represent the structure of server controls. When developing a webpage, structure among server controls allow developers to leverage the advantages of object oriented programming. By way of example, server controls allow web developers to easily replicate functionality of webpages without having to replicate the computer instructions on each webpage. The object oriented structure allows developers to hide implementation details and focus on the results in a clearly defined interface. Additionally, slight modification of functionality of objects can be performed by slightly modifying old objects.

One of ordinary skill in the art may conceptualize the server data structure 104 shown in FIG. 1 as a tree data-structure. A node is a portion of a tree-data structure that may contain a value, a condition, or represent another data structure. The top most node is generally known as a root. Nodes directly below another node are known as children to the node above. A node above other nodes is known as the parent. As an example, server data structure 104 represents a tree with hierarchical form that may be found on the server 102. In embodiments of the present invention, a node contains code related to a server control. Additionally, as is known in the art, using a tree-structure simplifies development in that child nodes may "inherit" from their parents. Such inheritance streamlines development since code need not be duplicated in many cases.

A network 106 facilitates communication between, inter alia, clients, servers, and code libraries. There are numerous types of networks that one skilled in the art could employ to allow devices to communicate with each other, using wireless or other technologies. In an embodiment, the network 106 could be the Internet. In other embodiments, the network could be a local area network ("LAN"). In a particular embodiment, the network might be a tightly coupled business network where the server system is relatively "dedicated" to a small number of computers in a LAN environment. In such a case, the server 102 is available to provide high-end processing services to the client 104 and/or other clients (not shown). The business server 102, in such an embodiment, may have specialized controls to access and report on specialized data created for a specific business.

Through the network 106, the client 108 requests services. In an embodiment, the client would send the server 102 a request to render a webpage. For example, requests initiated by the user-agent 110 and sent by the client 108 might be directed to a page using ASP.NET. In an embodiment, the server 102 will deliver, inter alia, computer instructions to the client. The received computer instructions relate, in some embodiments, to specific functionality needed by the client 108 to perform very specific functions. These functions may relate to business objectives or controls particular to the server-side system. As discussed above, the server-side system 102 may have organized its data/functional components into a tree-like structure 104. The execution of at least some of these received instructions on the client 108 essentially causes the execution of code that carries out the business objectives.

When the client 108 executes some of the received computer instructions, it may also cause the client computer 108 to create a user-agent data structure 110 that mirrors at least some portion of the server agent-data structure 104. The data structure 110 may be considered client peer controls that replicate the structure and function of the server controls for a specific webpage. Consequently, the client 108 may now be functionally equivalent to the server side with respect to the specific web page. That said, however, one skilled in the art will appreciate that the client-side controls may also include some call-backs to the server 102 to carry out specific requests as part of the design of the specific webpage.

Code library 112 is shown to indicate that it may be accessed, directly or indirectly, in some embodiments to get code or other instructions necessary to carry out certain other functions, i.e., functions that are not delivered as part of the creation of the client-side data structure 110. This library 112 may be delivered to the client in one large chunk at some point independent of execution of the client-side functionality or it may be accessed by the client as needed. However, in embodiments of the invention, access to such a library is reduced as client-side functionality is delivered as nodes (structure 110) that are delivered to the client 108. Storing such functionality in the nodes reduces or eliminates such dependencies on library 112, as discussed below.

Figure 2:
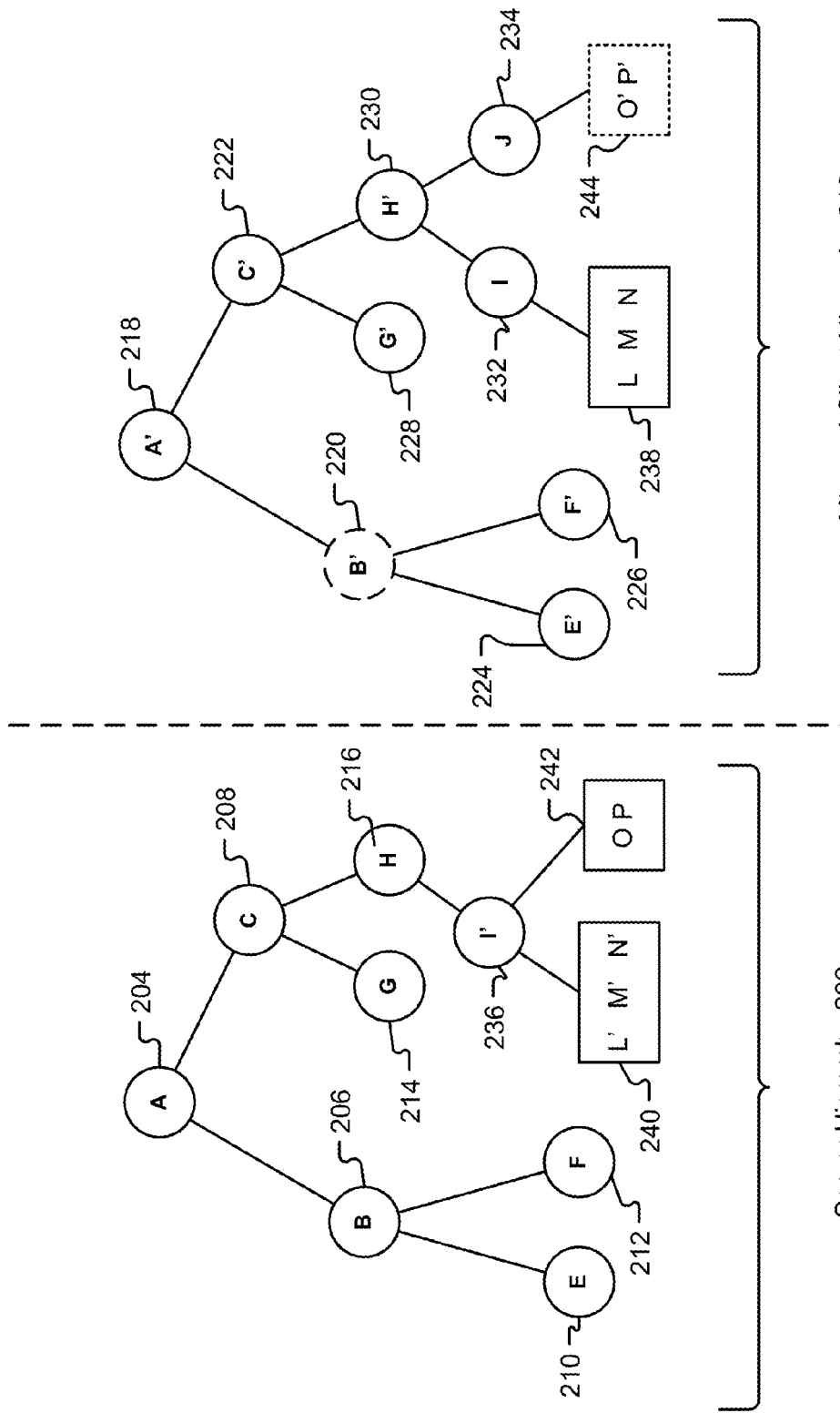
FIG. 2 illustrates an embodiment of a server-side hierarchical structure mirrored as a client-side hierarchical structure on a user-agent.

FIG. 2 illustrates an embodiment of a server hierarchical structure 202 that might be generated on a user agent or client (such as client 108, FIG. 1), as mirrored client hierarchy 216. In operation, a user-agent requests a page (e.g., a webpage) requiring some or all nodes 202 to be instantiated on the client. FIG. 2 represents an exemplary embodiment of the server hierarchy where only part of hierarchical structure was delivered to the client. Those skilled in the art will recognize that many different permutations of the example shown and described in conjunction with FIG. 2 are possible. Root node A 204 of the server control was instantiated as root node A' 218 on the client as a client control, also referred to herein as a client peer control. In an embodiment server control B 206 does not have a mirrored hierarchical client control B' 220 (as represented by the dashed circle), but the children of server control B 206, i.e., nodes E 210 and F 212, may be mirrored as client controls on the client side shown as E' 224 and F' 226. This situation may arise, for example, where a particular server side control, such as server control B 206, offers no necessary or desired client-side functionality. Specific examples may include controls for organizing static layout. The methods for determining whether structures are replicated on the client are discussed with reference to FIG. 4 and FIG. 6 below.

In an embodiment, the user-agent may ask for node or structure C' 222 to mirror structure C 208, e.g., by sending a specific request to the server for required computer instructions related to structure C 208. In response, the server may deliver structures C' 222, and G' 228 and H' 230. Further, in an example, the client may create additional structures I 232, J 234, and L M N 238. In some embodiments, this creation may occur after the server delivered additional information upon a page request from the user-agent. In other embodiments, this might occur during the client-side execution of JS code. As an example, the execution of the client-control I 232 might create nodes L M and N 240. Additionally, the server may then create or mirror I 232 as server control I' 236 on the server.

The client peer controls 216 may, in some cases, generate HTML themselves. In an embodiment, node H' 230 may be a placeholder markup which is filled out by a client peer control. Benefits of this include the reduction of data sent to the client 104 to render the page. The result may be that a client control can be created, filled out and used without server interaction. The client peer control, having been delegated to create markup by the sever control, may additionally generate other controls, such as L M and N 240 shown in FIG. 2. This may provide the important benefit of eliminating duplication of code in that the server did not create it once on the server and then send it to the client, but instead the client created it locally, i.e., on the client. Consequently, some client side generation of nodes, such as nodes 238, limits reliance on server controls to render a page.

In some embodiments, the server may need to perform critical functions to render a page. As an example, node J 234 may require information on the server to create additional controls. In an embodiment, this might be accomplished by the use of Extensible Markup Language ("XML") database. The root nodes of the markup might be stored as XML in the database. When a request is made, the XML code might create server control nodes O P 242. In these instances, the server controls may render as part of a page, but only the root nodes of the markup and binding code O' P' 244 are returned to the client. To accomplish the collection of XML, a placeholder might be created. In an embodiment, ASP.NET may be used so that the server control can override its render lifecycle step. After the render lifecycle step is complete, the buffers for each placeholder are collected and returned to the client using the structure described in FIG. 3.

In some instances, the server may mirror the structures created on the client side, as illustrated by I' 236, and L' M' N' 240. In other instances, the server may not, as illustrated by no corresponding server-side structure for the client-side structure J 234. In essence, the server side hierarchy 202, in some embodiments, merely provides a shell or guide for creating and/or managing the creation of the ultimate client hierarchy 216 on the client that executes the business objectives of the system.

Figure 3:
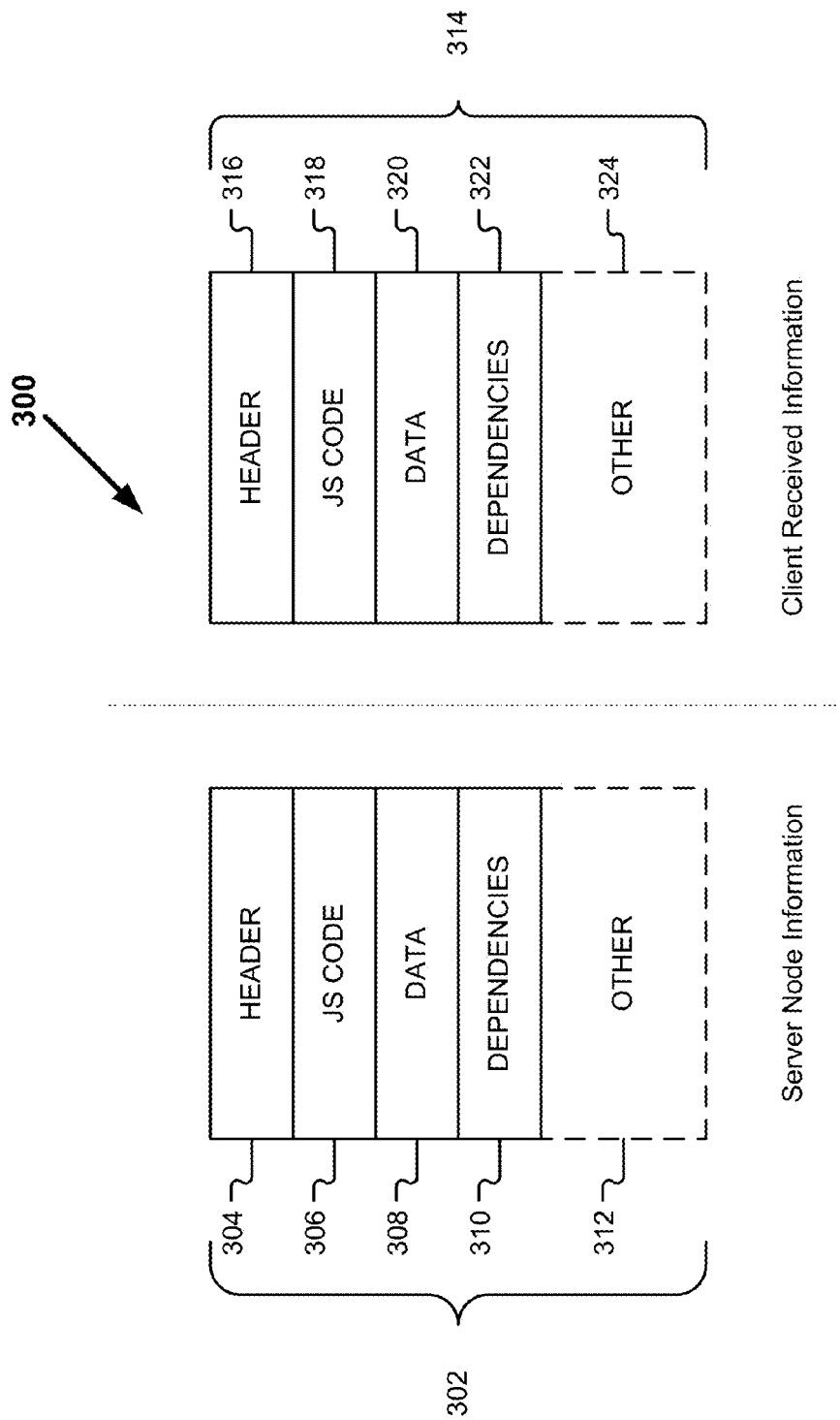
FIG. 3 illustrates server information delivered to a user-agent, in an embodiment.

FIG. 3 illustrates an embodiment of server node information 302 delivered as client received information 314. While node 314 represents the mirror of node 302, it will be appreciated that node 302 is but an example of one of the nodes 202 and that node 314 is a corresponding example of one of the nodes 216 shown and described above in conjunction with FIG. 2. In an embodiment, server node information 302 may be implemented using JavaScript Object Notation ("JSON"). Node 302 might contain version, failure codes, exceptions, data, dependencies, etc. The structure of node 302 is such that it can be directly evaluated on the client side, perhaps using a JS function to produce a result, and it can be assessed to determine whether the result is valid. To accomplish this, the message may contain a prefix with specific code.

Header 304 may contain typical information found in an HTTP header such as HTTP version, content size, content encoding type, etc. As may be appreciated, the header 304 may contain other relevant information related to other protocols. The header element 304 is delivered to the user-agent and becomes header 316.

In an embodiment, the server node information 302 may contain JS code 306. Portions of this JS code 306 might contain instructions directing the client on how to create a mirrored hierarchical structure on the user-agent. The user-agent receives the JS code and executes the code as 318. In one embodiment, the JS delivered to the client as 318 does not come from a general library. Instead, the code instead is specific. In another embodiment, the code 318 allows for the independent creation of portions of the webpage.

The client peer control 314 may make use of library code and can retrieve from the library code by way of a specific function, such as an ASP.net client script handler. Utility functions may be created that allow a client peer control to request a number of computer scripts from libraries to execute blocks of code after the dependencies 310 have been loaded. For example, AJAX may be used to iteratively retrieve each required script and evaluate it; once all required scripts have been retrieved and evaluated, the user-defined code is evaluated to perform the operation required. The evaluation may include a function that evaluates the data string to produce a payload returned from the server.

Code 318, while representing the client side version of server-side code 306, may be different from the actual code 306 because it may include call backs to the server or calls to other clients. Importantly, this code 318 is specifically designed to allow the client to carry out some specific functions without linking to a generic library.

Data 308 represents the data residing on the server as part of the server node information, and the data 320 represents the data residing on the client as part of the client received information. In an embodiment, this data might include strings, text, numbers, or other attributes associate with the server node. During execution of the JS code 318, the data 318 may be supplemented, removed, or remain constant. The data 318 is the response from whatever server-side operation was performed. This may be implemented by using JSON. To prevent the user-agent from evaluating any code that may be contained in the data, the data may generally be encoded as a string. This allows the dependencies to be evaluated first, and it prevents the problem of code being evaluated that requires dependencies when those dependencies have yet to be retrieved.

The dependencies 310 of the server node 302 are delivered to the client. These dependencies represent the server control hierarchical structure. These dependencies may also contain JS code, data, and dependencies to further replicate the tree structure on the client side, as an example. The dependencies are simply an array of type names that need to be retrieved from the server. In an embodiment, the server control names will correspond to the appropriate JS file. A custom ASP.NET function might be used to translate a request for a specific type of server control name into a script using the following steps: (1) locate a .NET object type based on the type name, (2) check .NET assembly for an embedded resource JS file that corresponds to the server control name, (3) return the contents of the embedded resource. In other embodiments, a function might be used to generate the client side script instead of locating and using an embedded resource. In other embodiments, a general function, such as ASP.NET's ClientScriptHandler might be used to create and retrieve third party controls that do not necessarily contain the naming scheme described above. These functions may have the ability to determine that there is no ".NET Type" for the type name and react appropriately, either by searching for an embedded resource or otherwise.

Other information sections 312 and 324 reflect information associated with the server node and the client node, respectively. This information is information that may or may not be appropriately categorized as header, JS code, data, or dependencies but may still be part of an exemplary node.

Figure 4:
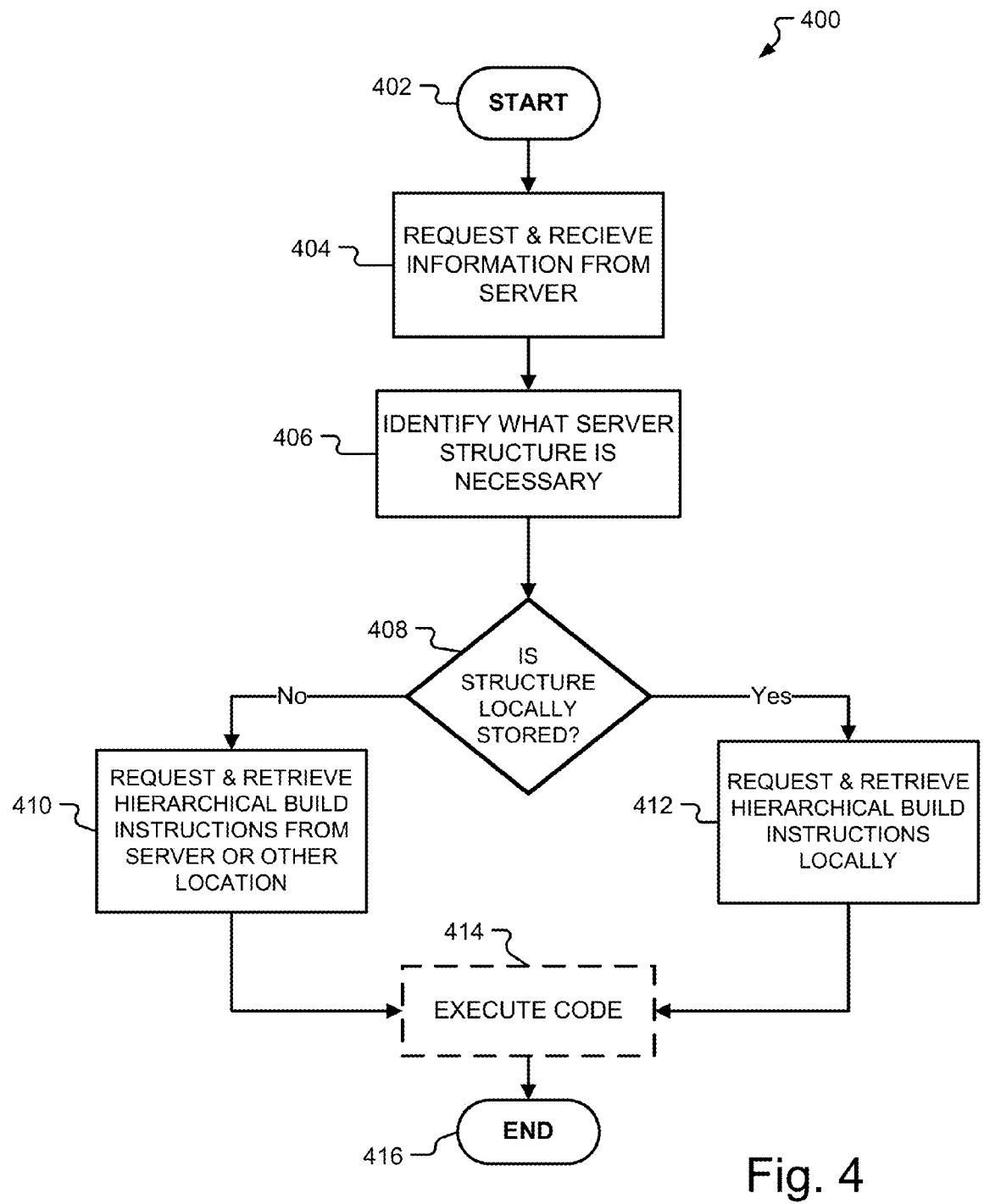
FIG. 4 is a flowchart representing an embodiment of a method for determining, by a client or user-agent, whether to retrieve a mirrored hierarchical build structure from a server or use locally stored instructions, e.g., instructions stored on the client.

FIG. 4 is a flowchart representing an embodiment of a method 400 for building a hierarchical structure on a client, e.g., client 108 shown and described above in conjunction with FIG. 1. The method 400 may be performed by a user-agent, a client, etc. The method 400 may begin at 402 when a user interacts with a user-agent. This interaction may be, for example, typing in a URL address into a browser. Or the method may begin by the user-agent recognizing that it needs additional structure from the server, i.e., without specific user interaction.

Send operation 402 sends a request for information. In an embodiment, the user-agent sends a request for information to the server. The user-agent might use HTTP to request that the server deliver the information. Included in this requested information might be information the server stored during a previous session with the client. In response to the request, the server sends, in an embodiment, information either directing the client as to what hierarchical structures are needed, or instructions on how to determine what hierarchical structures are needed. In certain embodiments, these structures mirror server controls or parts of the server controls.

A client peer control might issue a request for information in two ways. First, the client may use a function. This function may use AJAX to send a request to an HTTP handler, e.g., a handler on the server. The handler may receive three pieces of information: (1) the method name to invoke, (2) the declaring type of the method to invoke and (3) the arguments to the method. The arguments may be URL encoded and given to the AJAX call. The handler may use .NET reflection to find the method and type of method identified by (1) and (2) and then invoke that method. The server-side methods take an HTTP request and may parse parameters as necessary. The server-side method may produce a result value or simply return normally. If there is a return value, the value may be converted to JSON, in some embodiments. This value may then become part of the delivered data 320.

In an embodiment, the HTTP handler may have special support for (1) catching exceptions and propagating them as the exception property of the return envelope, (2) determining the types that are required to evaluate the data property on the client, and (3) determining if there are any fault conditions such as an unauthorized user. Faults are propagated to the client as a failure. In the case of authentication failure, the user authentication process may occur again.

In an alternative embodiment, an ASP.NET page is used. For example, the page may be engineered to take a fragment page and produce HTML fragments. The page may specifically require the identifier of a database record where the XML can be found. The resulting HTML fragment may be inserted into a specific Document Object Model node in the user agent. Generally, the client peer control, however, decides specifically what to do with the result in such an embodiment.

Identify operation 406 identifies the client-side structure that is needed. In an embodiment, the client will identify a needed server structure. For instance, the server may have sent information effectively determining what structures are necessary and the client simply parses this information. In another embodiment, the user-agent might instead execute code to identify the necessary structure. Upon recognizing the need for additional structure, the user-agent may request additional structure from the server.

Next, determine operation 408 determines whether the structure is stored locally, e.g., whether the structure has been cached or otherwise previously stored on the client device. In an embodiment, the client determines whether the structure is stored locally. In an embodiment, the information might be stored in a web browser cache. In another embodiment, the information might be stored in a different client-side library.

If the information to build hierarchical structure is stored locally, the method 400 branches Yes and proceeds to 412 where client retrieves the instructions and information to build the hierarchical structure.

Next, the execution of the build structure step is represented by execute code operation 414. Execute code operation 414 builds a hierarchical version of the code on the client.

If the structure is not stored locally as determined by determine operation 408, then flow 400 branches No to request operation 410. Request operation 410 requests and consequently retrieves the hierarchical build instructions. In an embodiment, the client asks the server for hierarchical build instructions and information, but other embodiments are contemplated where the client retrieves the information from another location, e.g., another server or repository. Following retrieval of the appropriate instructions the client then executed the code and builds the structure execute code operation 414. The process 400 ends following execute code operation 414 at end 416.

Figure 5:
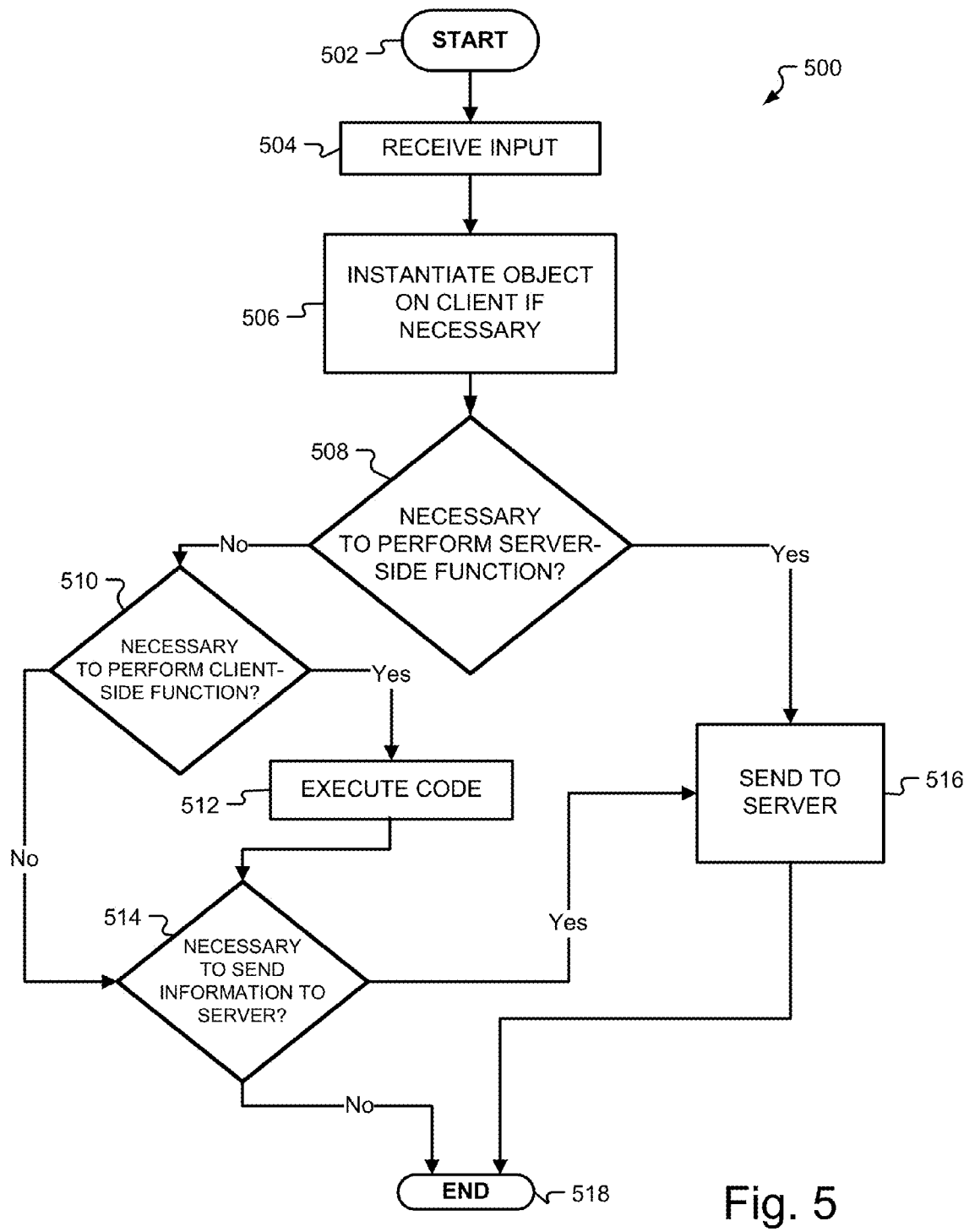
FIG. 5 is an illustration of a flowchart representing an embodiment of a method for the user-agent instantiating objects on the client-side, determining whether it is necessary to perform client-side or server-side functions, and determining whether to send information to server.

FIG. 5 is a flowchart representing an embodiment of a method 500 for the running methods on client-side.

In an embodiment, the process begins method 500 when a user attempts to interact with a webpage.

Receive operation 504 receives input such as user input on specific webpage. This input might be user identification information, such as name, password, etc. In other embodiments it might be business information such as the name of a new sales-lead, the name of a potential supplier, or the associated contact information. As will be appreciated by those skilled in the art, such user input may not be required in some embodiments.

Continuing with this example, following receive operation 504 instantiate operation 506 instantiates an object on the user-agent if necessary based on the input received from the user. That is, a user may attempt to input new information, causing instantiate operation 506 to instantiate a new object, such as an object representing a new sales-lead on the user-agent. Alternatively, the object may be a simple text output returned to the user-agent. In other embodiments, instantiate object operation 506 may be optional in that no object needs to be instantiated, as the computer instructions might be merely procedural manipulation of the input.

In some specific embodiments, it may be desired for the server to perform functions on the user inputted data. In such cases, determine operation 508 determines whether server interaction is necessary. In a particular example, a user might input information (input operation 504) with respect to a new sales-lead. The user may further desire, for example, to understand all historical information known to the company with respect to the new sales-lead. In such an embodiment, a client-side control for identifying historical data is created and such a peer control represents a mirrored server-side control. Additionally, the client-side control might request that the corresponding server-side control perform functions on the server based on the user input to identify and return specific historical data. In such a case, determine operation determines it is necessary to perform server-side functions and flow 500 branches Yes to send operation 516. If this is so, the information request is sent back to the server at 516.

Alternatively, if it is determined, at determine operation 508 that server-side interaction is not necessary, then flow branches No to determine operation 510. That is, the client control may be capable of performing the functions on the user input itself, without server interaction. By way of example, the client control may be capable of changing the graphical display of a report. Upon determining that the client-side functionality is appropriate, flow branches Yes to execute code step 512 which then executes the required functions. Although steps 510 and 512 are illustrated as discrete steps, in embodiments execute code 512 operation may simply execute the code when instantiated at operation 506.

That said however, it is contemplated that a determination may be made, at determination operation 510 that no client side functions need to be executed, or more specifically that it is or may be necessary to send information to the server. In such an embodiment, flow branches No from operation 510 to evaluate operation 514. Evaluate operation 514 evaluates whether information should be sent to the server. This might be information regarding the results of any function performed on the client-side or some other information. If so, the information is delivered to the server at send operation 516. Further, following execute code operation 512, the client may also evaluate whether information should be delivered to the server at evaluate operation 514 as shown in FIG. 5.

Figure 6:
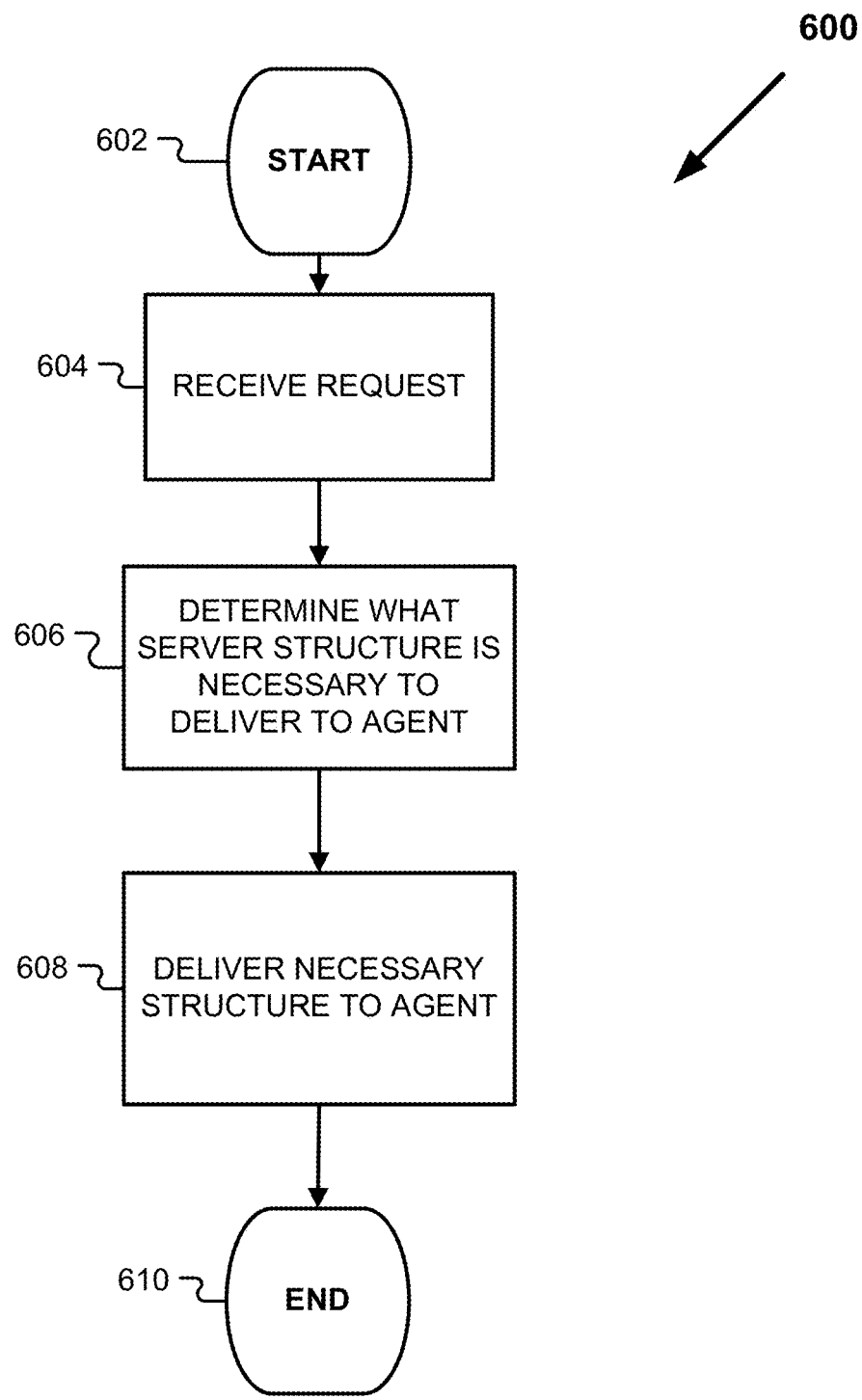
FIG. 6 is a flowchart representing an embodiment of a method for the server managing the user-agent in creating the mirrored hierarchical structure.

FIG. 6 is a flowchart representing an embodiment of a method 600 for the server managing the creation of the mirrored hierarchical structure on the client.

Initially, receive function 604 receives a request related to building a client-side hierarchal data structure that mirror a server-side structure. In an embodiment, the process begins with the server receiving a request from a user-agent requesting information for rendering a webpage.

The determination of what structures need be delivered is made at determine operation 606. In an embodiment, the server determines at 606 what server control structure should be replicated on the client based on the particular webpage the user is trying to access.

Finally, the delivery of instructions step occurs at 608. In an embodiment, the server delivers the appropriate structure to the user-agent at 608.

Figure 7:
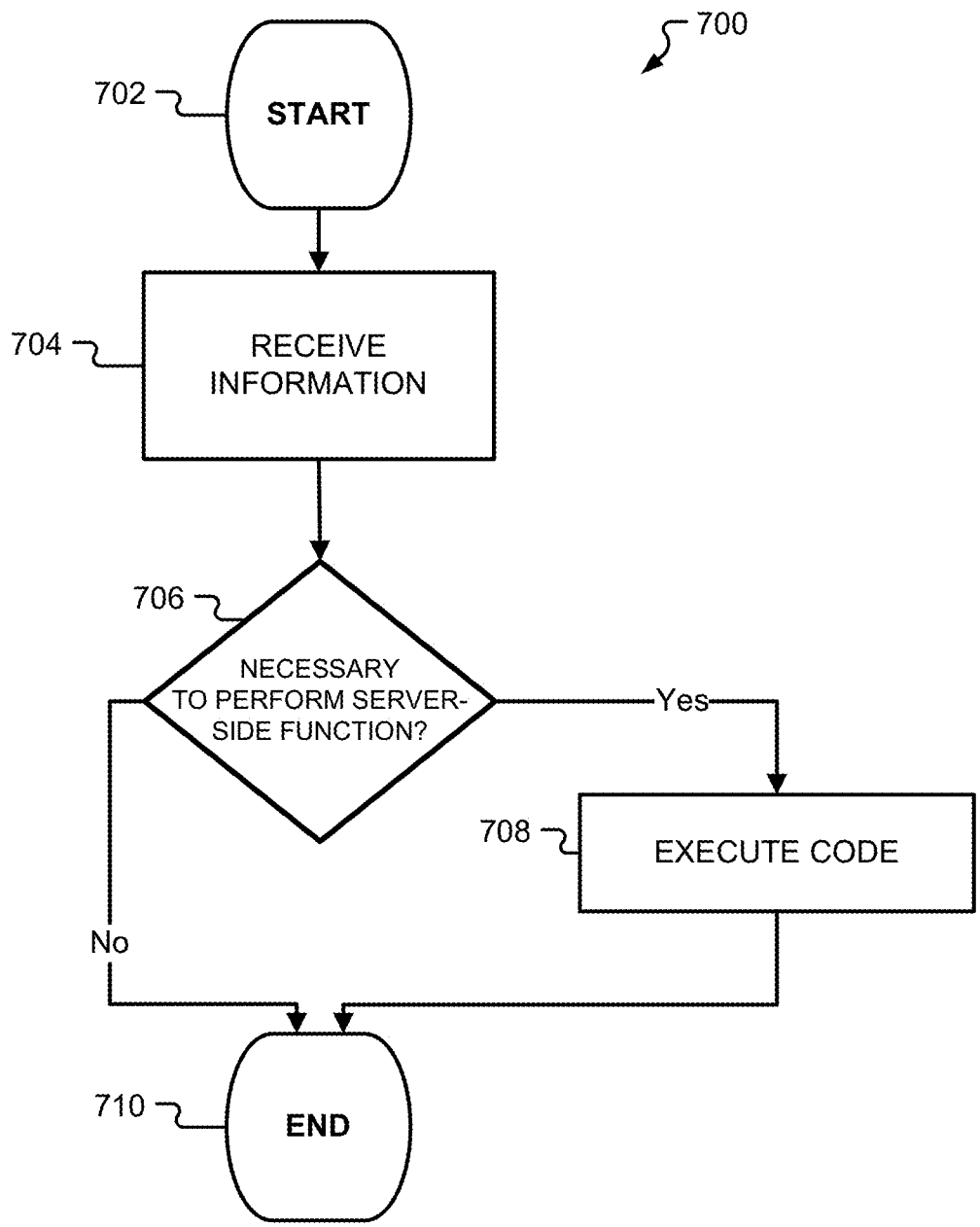
FIG. 7 is a flowchart representing an embodiment of a method for the server performing server-side functions.

FIG. 7 is an illustration of a flowchart representing an embodiment of a method 700 for the server adding information to its structure.

The process begins at 702, where the server receives information. This information might be requests from the user-agent for build instructions, or it may be the result of client side functions. In an embodiment, this information comes from a user-agent. This information might be in the form of additional structure that should or should not be added to the server-side.

Should the server-side structure need to be updated, the server-side structure is updated at update operation 704.

As necessary, and determined by determine operation 706, the server will execute functions on the information received by the server execute code operation 708.

Figure 8:
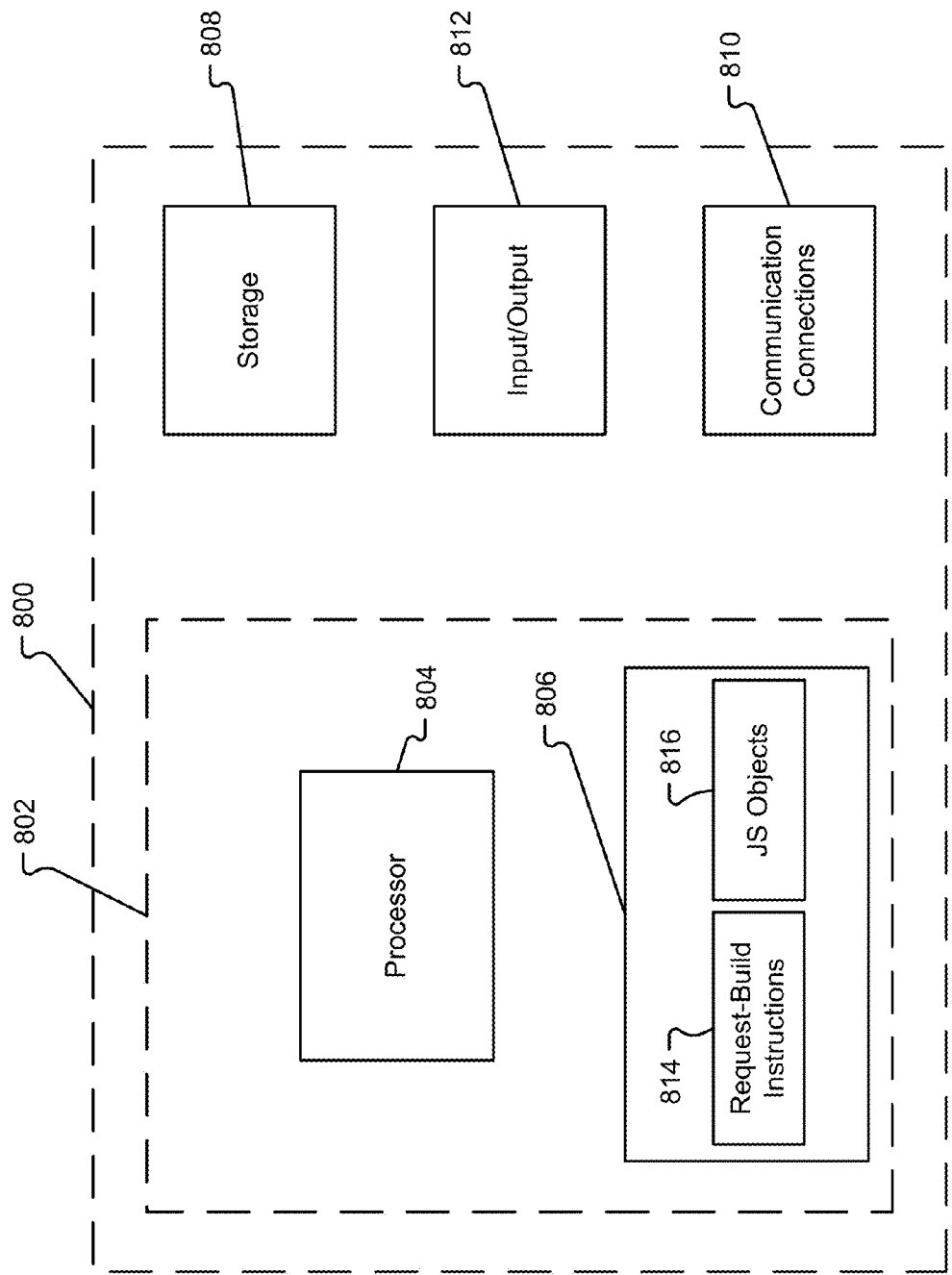
FIG. 8 represents a computer environment for implementing embodiments of computer systems and methods disclosed herein.

With reference to FIG. 8, an embodiment of a computing environment for implementing the various embodiments described herein includes a computer system, such as computer system 800. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 800 comprises at least one processing unit or processor 804 and system memory 806 The most basic configuration of the computer system 800 is illustrated in FIG. 8 by dashed line 802. In some embodiments, one or more components of the described system are loaded into system memory 806 and executed by the processing unit 804 from system memory 806. Depending on the exact configuration and type of computer system, system memory 806 may be volatile (such as RAM), non-volatile (such as ROM, flash memory, etc.), or some combination of the two.

Additionally, computer system 800 may also have additional features/functionality. For example, computer system 800 includes additional storage media 808, such as removable and/or non-removable storage, including, but not limited to, magnetic or optical disks or tape. In some embodiments, software or executable code and any data used for the described system is permanently stored in storage media 808. Storage media 808 includes volatile and non-volatile, removable and non-removable media implemented in any method or technology for storage of information such as computer readable instructions, data structures, program modules, or other data. In embodiments, the computer executable instructions used to perform the methods disclosed herein, such as, but not limited to, the methods 400 (FIG. 4), 500 (FIG. 5), 600 (FIG. 6), and 700 (FIG. 7).

System memory 806 and storage media 808 are examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 800 and processor 804. Any such computer storage media may be part of computer system 800. In embodiments, system memory 806 and/or storage media 808 stores data used to perform the methods and/or form the system(s) disclosed herein, such as, requesting build instructions or storing JS objects.

Computer system 800 may also contain communications connection(s) 810 that allow the device to communicate with other devices. In embodiments, communications connection(s) 810 may be used to transmit and receive messages between sender devices, intermediary devices, and recipient devices. Communication connection(s) 810 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media.

In some embodiments, computer system 800 also includes input and output connections 812, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 812 are used to display the information as described herein. All these devices are well known in the art and need not be discussed at length here.

In some embodiments, the component described herein comprise such modules or instructions executable by computer system 800 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above may also be included within the scope of readable media. In some embodiments, computer system 800 is part of a network that stores data in remote storage media for use by the computer system 800.

This disclosure described some embodiments with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

What is claimed is:

1. A computer implemented method for mirroring server-side data hierarchy on a client, the method comprising:

receiving a request for instructions to be executed on the client;

determining that a webpage requires a mirrored structure to be created on the client side;

delivering computer instructions, wherein the computer instructions comprise information that, when executed, instantiate a client-peer control on the client;

wherein the client peer-control replicates a portion of an hierarchical structure and function of a corresponding server control for a webpage to form a client-side data hierarchy, and the mirrored structure at least in part by generating HTML script such that the HTML script is used to render at least a portion of a webpage and at least in part by using an embedded resource embedded in an assembly that is identified by a type name associated with a specific type of server control name; and wherein the client peer-control translates a second request into script, wherein the translating comprises:
   locating an object type based on a type name associated with the specific type of server control name;
   checking an assembly for an embedded resource file that corresponds to the server control name; and
   returning the contents of the embedded resource;

wherein the client-peer control uses locally cached information to build at least a portion of the client-side data hierarchy; and wherein the mirror structure comprises at least a portion of the server-side data hierarchy.

2. A method as defined in claim 1 wherein the computer instructions comprise JavaScript.

3. A method as defined in claim 1 wherein the portion of the server-side data hierarchy that the client peer-control replicates is a tree data structure and further comprises:
   a plurality of server-side nodes, each node comprising substantially independent functionality.

4. A method as defined in claim 3 wherein the result of the client-peer control replication is a client-side data hierarchy mirroring the server-side data hierarchy, the client-side data hierarchy comprising a plurality of client-side nodes, wherein each client-side node corresponds with one of the plurality of server-side nodes.

5. A computer implemented method for creating a client-side data hierarchy that mirrors a server-side data hierarchy, the method comprising:
   sending a request, by a client computer system, for predetermined functionality to a server computer system;
   receiving computer instructions from the sever computer system;
   executing the received computer instructions, wherein the executing of the computer instructions instantiates a client-peer control on the client computer system;
   replicating, by the client-peer control, a portion of an hierarchical structure and function of a corresponding server control for a webpage to form a client-side data hierarchy,
   wherein the client-peer control generates HTML script, such that the HTML script is used to render at least a portion of a webpage;
   wherein the client-peer control uses locally cached information to build at least a portion of the client-side data hierarchy;
   identifying another request for a specific type of server control name;
   translating the second request into script, wherein the translating comprises:
      locating an object type based on a type name associated with the specific type of server control name;
      checking an assembly for an embedded resource file that corresponds to the server control name; and
      returning the contents of the embedded resource.

6. A computer implemented method as defined in claim 5 wherein the method further comprises the client-peer control using information stored in a library independent from the server to replicate the portion of the hierarchical structure and function of a corresponding server control for a specific webpage.

7. A computer implemented method as defined in claim 5 wherein the wherein the computer instructions comprise JavaScript.

8. A method as defined in claim 5 wherein the portion of an hierarchical structure and function of a corresponding server control for a specific webpage includes a tree data structure and further comprises:
   a plurality of server-side nodes, each node comprising substantially independent functionality.

9. A method as defined in claim 5 wherein the computer instructions include code, that when executed, cause the client-control to initiate requests back to the server.

10. A method as defined in claim 5 wherein the client-peer control independently creates nodes on the client that do not exist on the server.

* * * * *